(12) United States Patent
Zhang et al.

(10) Patent No.: US 8,868,061 B2
(45) Date of Patent: Oct. 21, 2014

(54) METHOD AND DEVICE FOR DETECTION IN CELL RANDOM ACCESS

(75) Inventors: Qingxue Zhang, Shanghai (CN); Tao Zhang, Shanghai (CN); Yinchang Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 13/333,713

(22) Filed: Dec. 21, 2011

(65) Prior Publication Data

US 2012/0165004 A1    Jun. 28, 2012

(30) Foreign Application Priority Data

Dec. 24, 2010   (CN) .......................... 2010 1 0621853

(51) Int. Cl.
*H04W 74/08* (2009.01)

(52) U.S. Cl.
USPC ........ 455/422.1; 455/450; 455/513; 455/502; 455/67.11; 370/210; 370/328; 370/331; 370/335; 370/208; 375/145; 375/260; 375/342; 375/343; 375/368

(58) Field of Classification Search
USPC ..................... 455/422.1, 450, 67.1, 513, 502; 375/342–343, 368, 135, 260, 145; 370/335, 210, 328, 331, 208
See application file for complete search history.

(56) References Cited

U.S. PATENT DOCUMENTS

| | | | |
|---|---|---|---|
| 8,422,602 B2 * | 4/2013 | Masuda et al. ................. | 375/343 |
| 2008/0310561 A1 * | 12/2008 | Song et al. .................... | 375/343 |

FOREIGN PATENT DOCUMENTS

| | | |
|---|---|---|
| CN | 101299745 A | 11/2008 |
| CN | 101330671 A | 12/2008 |
| WO | WO 2010/128769 A2 | 11/2010 |

OTHER PUBLICATIONS

Search Report issued in corresponding Chinese Patent Application No. 2010106218539, mailed Sep. 12, 2012.
LTE, "3$^{rd}$ Generation Partnership Project; Technical Specification Group Radio Access Network; Evolved Universal Terrestrial Radio Access (E-UTRA); Physical Channels and Modulation" (Release 8) 3GPP TS 36.211, V8.7.0, May 2009.
Author Unknown, "The Research of Rach in the LTE" Beijing University of Posts and Telecommunications Feb. 28, 2007.
Author Unknown, "3GPP Long-Term Evolution (LTE) Technical Principles and System Design" Jul. 2008.

* cited by examiner

*Primary Examiner* — Michael T Vu
(74) *Attorney, Agent, or Firm* — Brinks Gilson & Lione

(57) ABSTRACT

A method and a device for detection in cell random access are provided. The method includes: extending an original format used for a random access procedure to change a CP range defined by the original format; in the process of extracting a time-domain signal of a random access channel, extracting and splitting input data into time-domain antenna data in the original format and time-domain antenna data in an enhanced format, and performing signal extraction processing on the time-domain antenna data in the original format and the time-domain antenna data in the enhanced format respectively; and in the process of detection, detecting the time-domain antenna data in the original format and the time-domain antenna data in the enhanced format after the signal extraction processing to obtain detection information. The method can improve the performance of a BS and reduce the network construction costs without affecting an MS.

13 Claims, 5 Drawing Sheets

METHOD AND DEVICE FOR DETECTION IN CELL RANDOM ACCESS

CROSS-REFERENCE TO RELATED APPLICATIONS

This application claims priority to Chinese Patent Application No. 201010621853.9, filed on Dec. 24, 2010, which is hereby incorporated by reference in its entirety.

FIELD OF THE INVENTION

The present invention relates to the field of network communications technologies, and in particular, to a method and a device for detection in cell random access.

BACKGROUND OF THE INVENTION

Currently, a cell coverage radius of a base station BS is an important index in the existing Long Term Evolution (Long Term Evolution, LTE) communication protocol. A large coverage radius can provide services for more mobile stations MSs in more remote locations.

Especially in areas such as deserts and sea surfaces, a large coverage radius can reduce the number of base stations and solve the problem of placing and maintaining the base stations, thereby greatly reducing network construction costs.

A mobile station MS can obtain subsequent services after accessing a BS through a random access procedure, and the random access procedure is borne on a random access channel (Random Access Channel, RACH). However, the existing LTE protocol defines five formats for the random access procedure, in which the maximum cell radius is 103 Km, incapable of covering a larger range of cells. In this way, a large number of BSs are required for network construction, thereby increasing the maintenance costs of network construction.

SUMMARY OF THE INVENTION

Embodiments of the present invention provide a method and a device for detection in cell random access, which improve the performance of a BS and reduce the network construction costs.

An embodiment of the present invention provides a method for detection in cell random access, where the method includes:

in a Long Term Evolution LTE protocol, extending an original format used for a random access procedure to change a cyclic prefix range defined by the original format, to obtain an enhanced format used for the random access procedure;

in a process of extracting a time-domain signal of a random access channel, extracting and splitting input data into time-domain antenna data in the original format and time-domain antenna data in the enhanced format, and performing signal extraction processing on the time-domain antenna data in the original format and the time-domain antenna data in the enhanced format respectively; and in a process of detection, respectively detecting the time-domain antenna data in the original format and the time-domain antenna data in the enhanced format after the signal extraction processing to obtain detection information.

An embodiment of the present invention further provides a device for detection in cell random access, where the device includes:

an extension setting unit, configured to: in a Long Term Evolution LTE protocol, extend an original format used for a random access procedure to change a cyclic prefix range defined by the original format, to obtain an enhanced format used for the random access procedure;

a random access channel time-domain signal extraction unit, configured to: in a process of extracting a time-domain signal of a random access channel, extract and split input data into time-domain antenna data in the original format and time-domain antenna data in the enhanced format;

a time-domain antenna data processing unit, configured to respectively perform signal extraction processing on the time-domain antenna data in the original format and the time-domain antenna data in the enhanced format that are obtained by extraction and splitting of the random access channel time-domain signal extraction unit; and a detection unit, configured to: in a process of detection, respectively detect the time-domain antenna data in the original format and the time-domain antenna data in the enhanced format that are processed by the time-domain antenna data processing unit to obtain detection information.

It can be seen from the technical solutions provided above that, the method includes: in the Long Term Evolution LTE protocol, extending an original format used for a random access procedure to change a cyclic prefix CP range defined by the original format; in the process of extracting the time-domain signal of the random access channel, extracting and splitting antenna input data into time-domain antenna data in the original format and time-domain antenna data in the enhanced format, and performing corresponding processing on the time-domain antenna data in the original format and the time-domain antenna data in the enhanced format respectively; and in the process of detection and delay estimation, detecting the time-domain antenna data in the original format and the time-domain antenna data in the enhanced format that are processed respectively to obtain detection information. By implementing the above method, a better access detection delay can be provided, the performance of a BS can be improved, and the network construction costs can be reduced without affecting an MS.

DETAILED DESCRIPTION OF THE EMBODIMENTS

Embodiments of the present invention provide a method and a device for detection in cell random access. The implementation of the method is as follows: By introducing an enhanced format in the LTE protocol, the maximum cell radius supported by the LTE system is increased optionally, for example, from 103 Km to 206 Km, so as to increase the coverage radius and accordingly increase the coverage range, thereby implementing super long range coverage. The solution only requires detection at the base station BS side, but the detection is invisible to the mobile station MS side, so that no additional function needs to be added at the MS side; meanwhile, processing units in non-super long range coverage basically can be used as processing units in the super long range coverage, so that the complexity in design and verification is reduced, and products can be put into market rapidly.

To describe the embodiments of the present invention in a better way, the specific embodiments of the present invention are illustrated with reference to the accompanying drawings.

Figure 1:
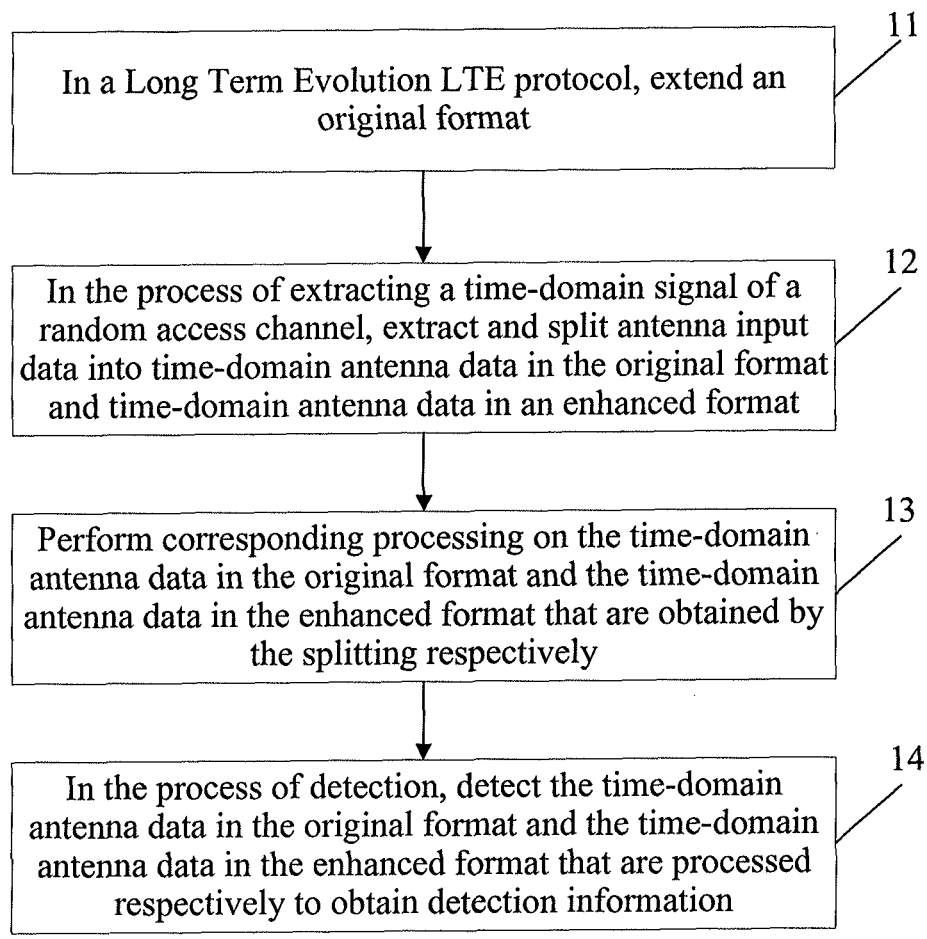
FIG. 1 is a schematic flow chart of a method for implementing cell random access in super long range coverage provided in an embodiment of the present invention.

As shown in FIG. 1, it is a schematic flow chart of a method for implementing cell random access in super long range coverage provided in an embodiment of the present invention. The method includes the following steps:

Step 11: In a Long Term Evolution LTE protocol, extend an original format.

In this step, specifically, an original format that is used for a random access procedure and is defined in the Long Term Evolution LTE protocol is extended to change a CP (Cyclic Prefix, cyclic prefix) range defined by the original format, so as to obtain an enhanced format used for the random access procedure. During the specific implementation, the extension may be preferably performed based on an original format3 to increase a CP range defined by the original format. Because the coverage radii of Format0, Format2, and Format4 are all smaller than those of format1 and format3; and the coverage radii of format 1 and format3 are the same, but format3 adopts a retransmission technology and achieves better detection in case of a large radius than format1, extension and optimization may be preferably performed based on the original format3.

Figure 2:
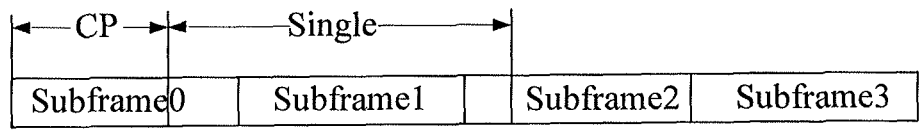
FIG. 2 is a schematic structural diagram of an original format3 in an LTE protocol in the prior art.

The specific extension process is to introduce an enhanced format3 based on the original format3 of the Long Term Evolution LTE protocol, and to increase a cyclic prefix CP range defined by the original format3 so as to cover a larger radius. An example is as follows:

The format 1 and format3 defined in the LTE protocol both support a cell coverage radius of 103 Km. FIG. 2 is a schematic structural diagram of the original format3 in the LTE protocol in the prior art. In FIG. 2, the protocol defines CP=21024 Ts, Single (single sequence)=24576*2 Ts, where 1 Ts=32.552 ns, so the supported coverage radius is 21024 Ts*3×108(m/s)/2=103 Km.

Figure 3:
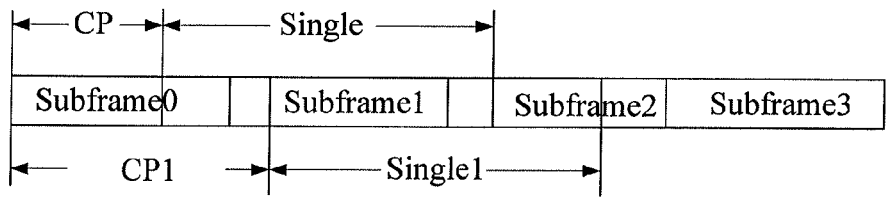
FIG. 3 is a schematic structural diagram of an extended format3 in an example provided in the method provided in the embodiment of the present invention.

In the embodiment of the present invention, the above original format3 is enhanced, and the definition of an enhanced format3 is introduced based on the original format3 of the protocol, so as to support super long range coverage. FIG. 3 is a schematic structural diagram of an extended format3 in a provided example. In FIG. 3, CP and Single correspond to the structure of the original format3, and CP1 and Single1 correspond to the structure of the enhanced format3, where CP1=2*CP and Single1=Single; then, the coverage radius supported after the extension is 42048 Ts*3×108(m/s)/2=206 Km. Based on the above, the cell coverage radius is increased by 100%, and the coverage range is increased by 300%, so as to support cell random access in the super long range coverage.

Step 12: In the process of extracting a time-domain signal of a random access channel, extract and split input data into time-domain antenna data in the original format and time-domain antenna data in an enhanced format.

In this step, after the extension in step 11, in the process of performing cell random access and extracting a time-domain signal of the random access channel, antenna input data may be extracted and split into time-domain antenna data in the original format and time-domain antenna data in the enhanced format.

Figure 4:
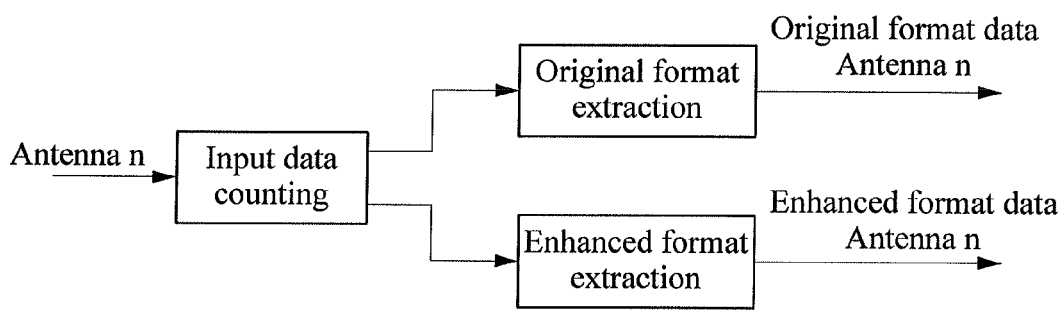
FIG. 4 is a schematic structural diagram of a time-domain signal extraction module in the example provided in the method provided in the embodiment of the present invention.

FIG. 4 is a schematic structural diagram of a time-domain signal extraction module in the provided example. In FIG. 4, a random access channel RACH time-domain signal extraction module is improved so that it can split input antenna data so as to obtain time-domain antenna data in the original format and time-domain antenna data in the enhanced format to perform subsequent processing.

Step 13: Respectively perform signal extraction processing on the time-domain antenna data in the original format and the time-domain antenna data in the enhanced format that are obtained by the splitting.

In this step, after the time-domain antenna data in the original format and the time-domain antenna data in the enhanced format are obtained by the splitting, the subsequent operation may be continued to perform corresponding processing on the time-domain antenna data in the original format and the time-domain antenna data in the enhanced format respectively.

The specific process of performing processing respectively herein is: performing processing including filter extraction, 1536-point two-dimensional Fourier transform DFT, reference sequence generation, frequency domain correlation, and 2048-point inverse fast Fourier transform IFFT on the time-domain antenna data in the original format and the time-domain antenna data in the enhanced format respectively.

During the implementation, the processing may be performed in parallel or in series.

Specifically, a corresponding processing may be performed on the time-domain antenna data in the original format and the time-domain antenna data in the enhanced format concurrently in parallel, for example, one set of processing modules are added to process the time-domain antenna data in the original format and the time-domain antenna data in the enhanced format concurrently in parallel, so as to obtain a smaller access detection delay; or, the time-domain antenna data in the original format and the time-domain antenna data in the enhanced format may also be buffered in advance, and then a corresponding processing is performed on them successively in series, so that it is not necessary to add one more set of processing modules, thereby saving corresponding resources.

Step 14: In the process of detection, respectively detect the time-domain antenna data in the original format and the time-domain antenna data in the enhanced format that are processed to obtain detection information.

Optionally, the process of detection may include a delay estimation procedure, and the time-domain antenna data in the original format and the time-domain antenna data in the enhanced format that are processed are detected respectively and delay estimation is implemented together.

In this step, after the processing in step 13, in the process of data detection and delay estimation, the time-domain antenna data in the original format and the time-domain antenna data in the enhanced format that are processed are detected respectively and delay estimation is implemented together, so as to obtain the detection information.

Figure 5:
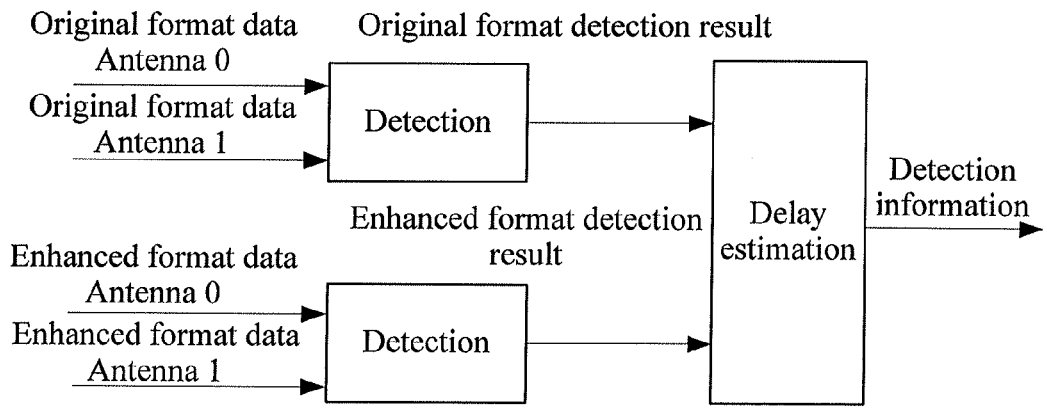
FIG. 5 is a schematic structural diagram of a detection module in the example provided in the method provided in the embodiment of the present invention.

FIG. 5 is a schematic structural diagram of a detection module in the provided example. In FIG. 5, the detection modules respectively receive original format data and enhanced format data, then respectively implement detection of the original format data and the enhanced format data, and finally obtain corresponding detection information. Optionally, the detection modules are further configured to implement delay estimation.

The obtained detection information may specifically include whether there is information about a mobile station MS requesting access, and after the detection information is obtained, the detection information is reported to a central processing unit to implement corresponding scheduling, for example, the detection information may be reported to a DSP/CPU to implement L2/L3 scheduling.

It can be seen from the implementation of the method that, the solution provided in the embodiment of the present invention can provide a cell random access range in super long range coverage without affecting an MS; meanwhile, the solution requires only detection at the base station BS side, but the detection is invisible to the mobile station MS side, so that no additional function needs to be added at the MS side, and processing units in non-super long range coverage basically can be used as processing units in the super long range coverage, so that the complexity in design and verification is reduced.

Figure 6:
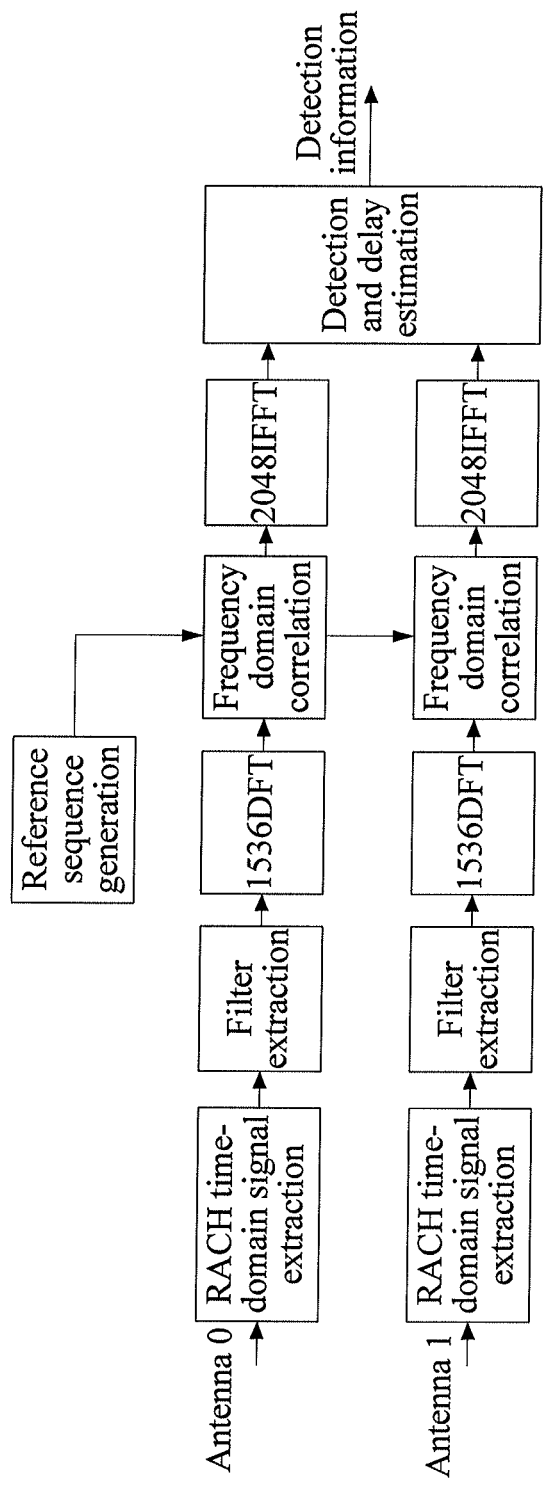
FIG. 6 is a schematic diagram illustrating implementation of a cell random access procedure in non-super long range coverage in an example provided in the prior art.
Figure 7:
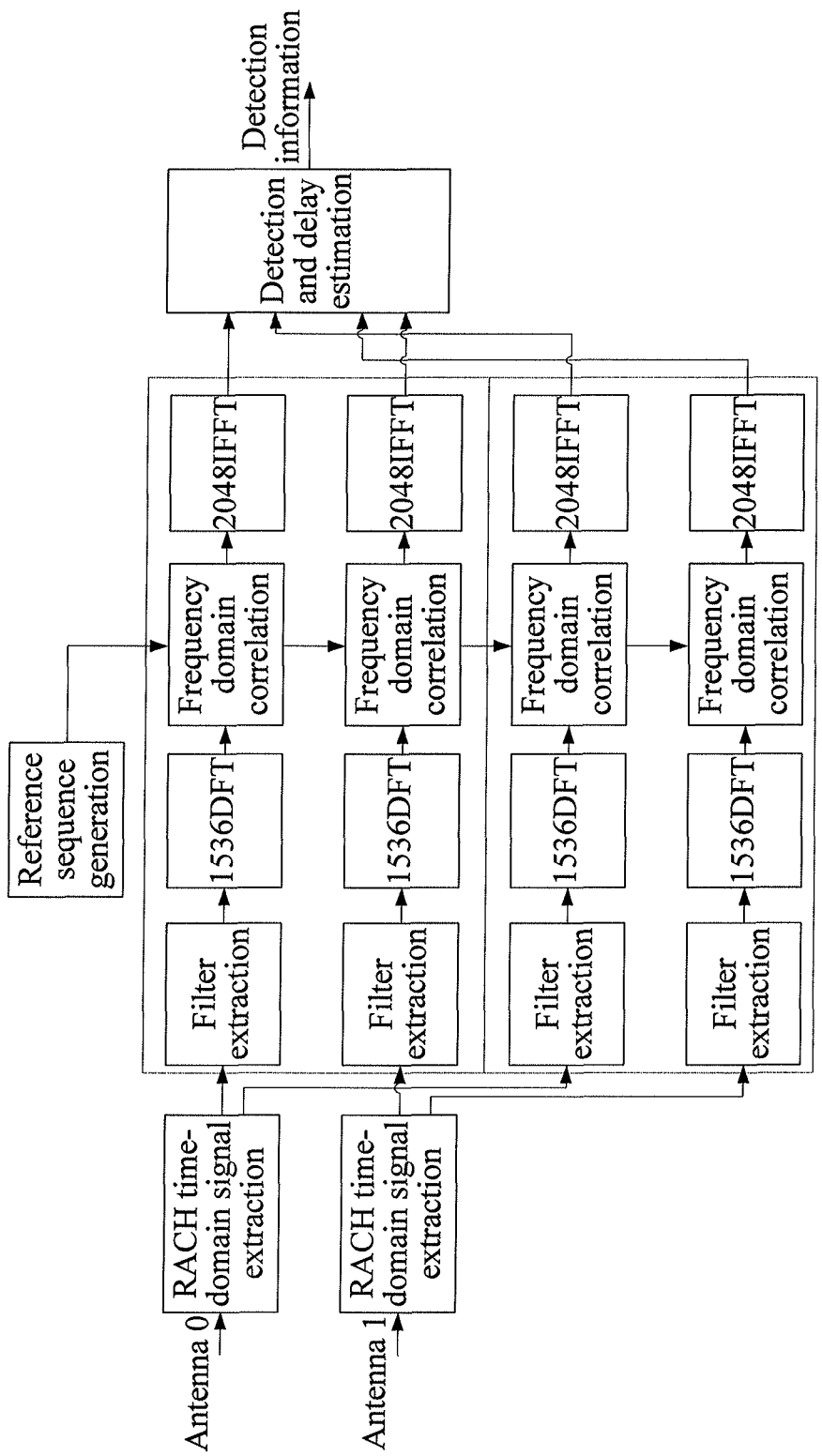
FIG. 7 is a schematic diagram illustrating implementation of a cell random access procedure in super long range coverage in an example provided in an embodiment of the present invention.

A specific example for implementing random access is provided in the following to describe the above method. FIG. 6 is a schematic diagram illustrating implementation of a cell random access procedure in non-super long range coverage in the prior art; and FIG. 7 is a schematic diagram illustrating implementation of a cell random access procedure in super long range coverage in an example provided in an embodiment of the present invention. The following is drawn from the comparison between FIG. 6 and FIG. 7:

Two antenna cells are taken as an example. When the enhanced format3 is not introduced, that is, in the scenario of non-super long range coverage, each antenna needs to complete processes including RACH time-domain signal extraction, filter extraction, 1536DFT, reference sequence generation, frequency domain correlation, and 2048IFFT, the processing procedures of the two antennas are the same; finally, processing including combination, detection, and estimation is performed on data obtained after the 2048IFFT of the two antennas to obtain corresponding detection information and detect whether there is an MS requesting access, which is shown in FIG. 6.

After the enhanced format3 is introduced, the RACH time-domain signal extraction module and the detection and time delay module need to be correspondingly improved, but the other parts are the same as those in the non-super long range coverage, which is shown in FIG. 7.

RACH time-domain signal extraction parts need to respectively obtain, by splitting, time-domain antenna data in the original format3 and time-domain antenna data in the enhanced format3, and then respectively perform processing from filter extraction to 2048IFFT.

In this example, two sets of modules are added during the processing from filter extraction to 2048IFFT, so that the time-domain antenna data in the original format3 and the time-domain antenna data in the enhanced format3 can be processed in parallel, thereby achieving a smaller access detection delay than serial processing.

During the implementation, if requirements for access delay are not strict, serial processing may also be adopted, which is specifically buffering the split time-domain antenna data in advance, then processing the time-domain antenna data in the original format3 and the time-domain antenna data in the enhanced format3 successively, and finally performing detection and delay estimation together, thereby saving part of the resources.

Figure 8:
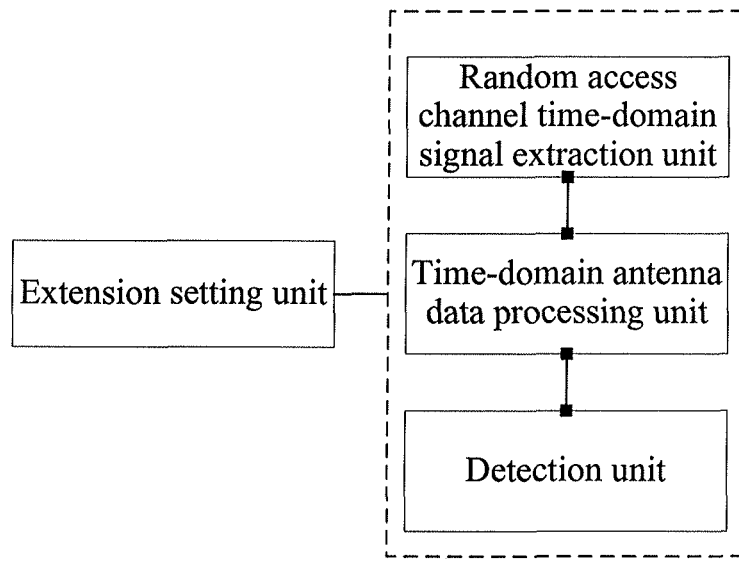
FIG. 8 is a schematic structural diagram of a device for implementing cell random access in super long range coverage provided in an embodiment of the present invention.

An embodiment of the present invention further provides a device for detection in cell random access. FIG. 8 is a schematic structural diagram of the device for detection in cell random access provided in the embodiment of the present invention. The device includes an extension setting unit, a random access channel time-domain signal extraction unit, a time-domain antenna data processing unit, and a detection unit.

The extension setting unit is configured to: in a Long Term Evolution LTE protocol, extend an original format used for a random access procedure to change a CP range defined by the original format, so as to obtain an enhanced format used for the random access procedure. Optionally, the changing the CP range defined by the original format may be increasing the CP range defined by the original format.

The random access channel time-domain signal extraction unit is configured to: in the process of extracting a time-domain signal of a random access channel, extract and split input data into time-domain antenna data in the original format and time-domain antenna data in the enhanced format.

The time-domain antenna data processing unit is configured to respectively perform signal extraction processing on the time-domain antenna data in the original format and the time-domain antenna data in the enhanced format that are obtained by extraction and splitting of the random access channel time-domain signal extraction unit.

The detection unit is configured to: in the process of detection and delay estimation, respectively detect the time-domain antenna data in the original format and the time-domain antenna data in the enhanced format that are processed by the time-domain antenna data processing unit to obtain detection information. Optionally, the detection unit is further configured to implement delay estimation.

During the specific implementation, the time-domain antenna data processing unit may further perform processing including filter extraction, two-dimensional Fourier transform DFT, reference sequence generation, frequency domain correlation, and inverse fast Fourier transform IFFT on the time-domain antenna data in the original format and the time-domain antenna data in the enhanced format respectively.

Figure 9:
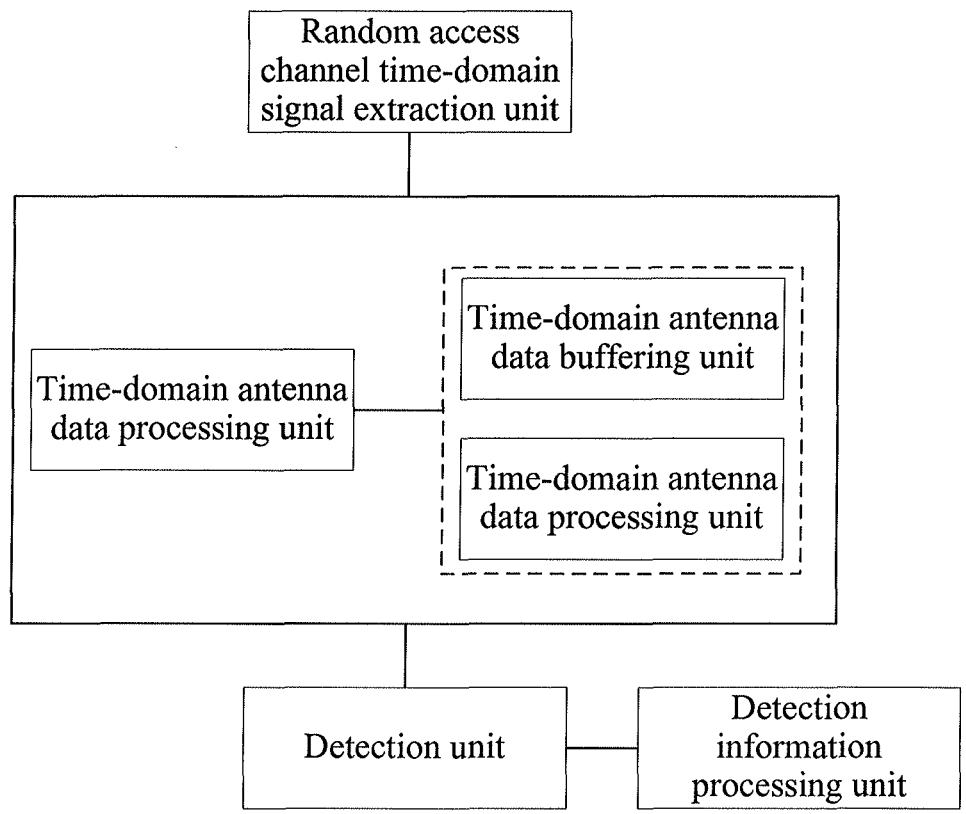
FIG. 9 is another schematic structural diagram of the device for implementing cell random access in super long range coverage provided in the embodiment of the present invention.

In addition, FIG. 9 is another schematic structural diagram of the device for implementing cell random access in super long range coverage provided in the embodiment of the present invention. The device increases a cell coverage radius by increasing the CP range defined by the original format, and may further include a detection information processing unit.

The detection information processing unit is configured to detect whether there is information about a mobile station MS requesting access, and report the obtained detection information to a central processing unit to implement corresponding scheduling.

The device may process the time-domain antenna data in parallel or in series, as specifically shown in FIG. 9.

If the device includes two sets of time-domain antenna data processing units, corresponding processing may be performed on the time-domain antenna data in the original format and the time-domain antenna data in the enhanced format concurrently in parallel through the two sets of time-domain antenna data processing units.

If the device includes a time-domain antenna data buffering unit, the time-domain antenna data in the original format and the time-domain antenna data in the enhanced format may be buffered in advance through the time-domain antenna data buffering unit, and then corresponding processing is performed on them successively in series through the time-domain antenna data processing unit.

For the specific implementation of the units in the above device, reference may be made to the description of the above method embodiment.

It should be noted that, the units included in the above device embodiment are divided just according to logical functions, but the present invention is not limited to the division, as long as corresponding functions can be realized; and specific names of the functional units are merely provided for the purpose of distinguishing the units from one another, but not intended to limit the protection scope of the present invention.

In addition, persons of ordinary skill in the art should understand that, all or part of the steps in the above method embodiment may be implemented by a program instructing relevant hardware. The corresponding program may be stored in a computer readable storage medium. The storage medium may be a read-only memory, a magnetic disk, or an optical disk.

In view of the above, in the embodiments of the present invention, the format specified in the LTE protocol is extended, which can provide cell random access in super long range coverage, greatly improve the performance of the BS, and reduce the network construction costs without affecting the MS.

The above descriptions are merely exemplary embodiments of the present invention, but not intended to limit the protection scope of the present invention. All variations or substitutions that can be easily figured out by persons skilled in the art within the technical scope of the present invention should fall within the protection scope of the present invention. Therefore, the protection scope of the invention is defined by the protection scope of the claims.

What is claimed is:

1. A method for detection in cell random access, comprising:

in a Long Term Evolution (LTE) protocol, extending an original format used for a random access procedure to change a cyclic prefix range defined by the original format, to obtain an enhanced format used for the random access procedure;

in a process of extracting a time-domain signal of a random access channel, extracting and splitting input data into time-domain antenna data in the original format and time-domain antenna data in the enhanced format, and performing signal extraction processing respectively on the time-domain antenna data in the original format and the time-domain antenna data in the enhanced format; and in a process of detection, detecting the time-domain antenna data in the original format and the time-domain antenna data in the enhanced format after the signal extraction processing to obtain detection information, wherein performing the signal extraction processing respectively on the time-domain antenna data in the original format and the time-domain antenna data in the enhanced format respectively comprises:

performing filter extraction, two-dimensional Fourier transform (2DFT), reference sequence generation, frequency domain correlation, and inverse fast Fourier transform (IFFT) respectively on the time-domain antenna data in the original format and the time-domain antenna data in the enhanced format.

2. The method according to claim 1, wherein the extending the original format used for the random access procedure to change the cyclic prefix range defined by the original format comprises:

based on the original format of the Long Term Evolution LTE protocol, increasing the cyclic prefix range defined by the original format to obtain the enhanced format, to obtain a larger cell coverage radius.

3. The method according to claim 1, wherein the obtaining the detection information comprises:

detecting whether there is information about a mobile station MS requesting access, and reporting the obtained detection information to a central processing unit to implement scheduling.

4. The method according to claim 1, wherein the performing the signal extraction processing on the time-domain antenna data in the original format and the time-domain antenna data in the enhanced format respectively comprises:

performing the signal extraction processing on the time-domain antenna data in the original format and the time-domain antenna data in the enhanced format in parallel;

or, buffering the time-domain antenna data in the original format and the time-domain antenna data in the enhanced format in advance, and then performing the signal extraction processing on the time-domain antenna data in the original format and the time-domain antenna data in the enhanced format successively in series.

5. A device for detection in cell random access, wherein the device comprises at least one processor operating in conjunction with a non-transitory storage medium and a plurality of units, the plurality of units comprise:

an extension setting unit, configured to: in a Long Term Evolution (LTE) protocol, extend an original format used for a random access procedure to change a cyclic prefix range defined by the original format, to obtain an enhanced format used for the random access procedure;

a random access channel time-domain signal extraction unit, configured to: in a process of extracting a time-domain signal of a random access channel, extract and split input data into time-domain antenna data in the original format and time-domain antenna data in the enhanced format;

a time-domain antenna data processing unit, configured to respectively perform signal extraction processing on the time-domain antenna data in the original format and the time-domain antenna data in the enhanced format that are obtained by extraction and splitting of the random access channel time-domain signal extraction unit; and a detection unit, configured to: in a process of detection, respectively detect the time-domain antenna data in the original format and the time-domain antenna data in the enhanced format to obtain detection information, wherein the time-domain antenna data processing unit further performs filter extraction, two-dimensional Fourier transform (2DFT), reference sequence generation, frequency domain correlation, and inverse fast Fourier transform (IFFT) on the time-domain antenna data in the original format and the time-domain antenna data in the enhanced format respectively.

6. The device according to claim 5, wherein the device further comprises:

a detection information processing unit, configured to detect whether there is information about a mobile station MS requesting access, and report the obtained detection information to a central processing unit to implement scheduling.

7. The device according to claim 5, wherein the device comprises two sets of time-domain antenna data processing units, configured to process the time-domain antenna data in the original format and the time-domain antenna data in the enhanced format in parallel respectively.

8. The device according to claim 5, wherein the device comprises:
a time-domain antenna data buffering unit, configured to buffer the time-domain antenna data in the original format and the time-domain antenna data in the enhanced format in advance, wherein the time-domain antenna data processing unit then performs the signal extraction processing on the time-domain antenna data in the original format and the time-domain antenna data in the enhanced format successively in series.

9. A base station, comprising a hardware processor and a non-transitory storage medium accessible to the processor, the base station is configured to:
extend an original format used for a random access procedure to change a cyclic prefix range defined by the original format;
obtain an enhanced format used for the random access procedure;
extract and split input data into time-domain antenna data in the original format and time-domain antenna data in the enhanced format;
wherein the base station is configured to respectively detect the time-domain antenna data in the original format and the time-domain antenna data in the enhanced format to obtain detection information; and
respectively perform filter extraction, two-dimensional Fourier transform (2DFT), reference sequence generation, frequency domain correlation, and inverse fast Fourier transform (IFFT) on the time-domain antenna data in the original format and the time-domain antenna data in the enhanced format.

10. The base station according to claim 9, wherein the base station is configured to detect whether there is information about a mobile station (MS) requesting access, and report the obtained detection information to a central processing unit to implement scheduling.

11. The base station according to claim 9, wherein the base station is configured to respectively process the time-domain antenna data in the original format and the time-domain antenna data in the enhanced format in parallel.

12. The base station according to claim 11, wherein the base station is configured to perform the signal extraction processing on the time-domain antenna data in the original format and the time-domain antenna data in the enhanced format successively in series.

13. The base station according to claim 9, wherein the base station is configured to buffer the time-domain antenna data in the original format and the time-domain antenna data in the enhanced format in advance.

* * * * *